N. D. HULL.
LIQUID MEASURING PUMP.
APPLICATION FILED DEC. 8, 1919. RENEWED OCT. 29, 1921.

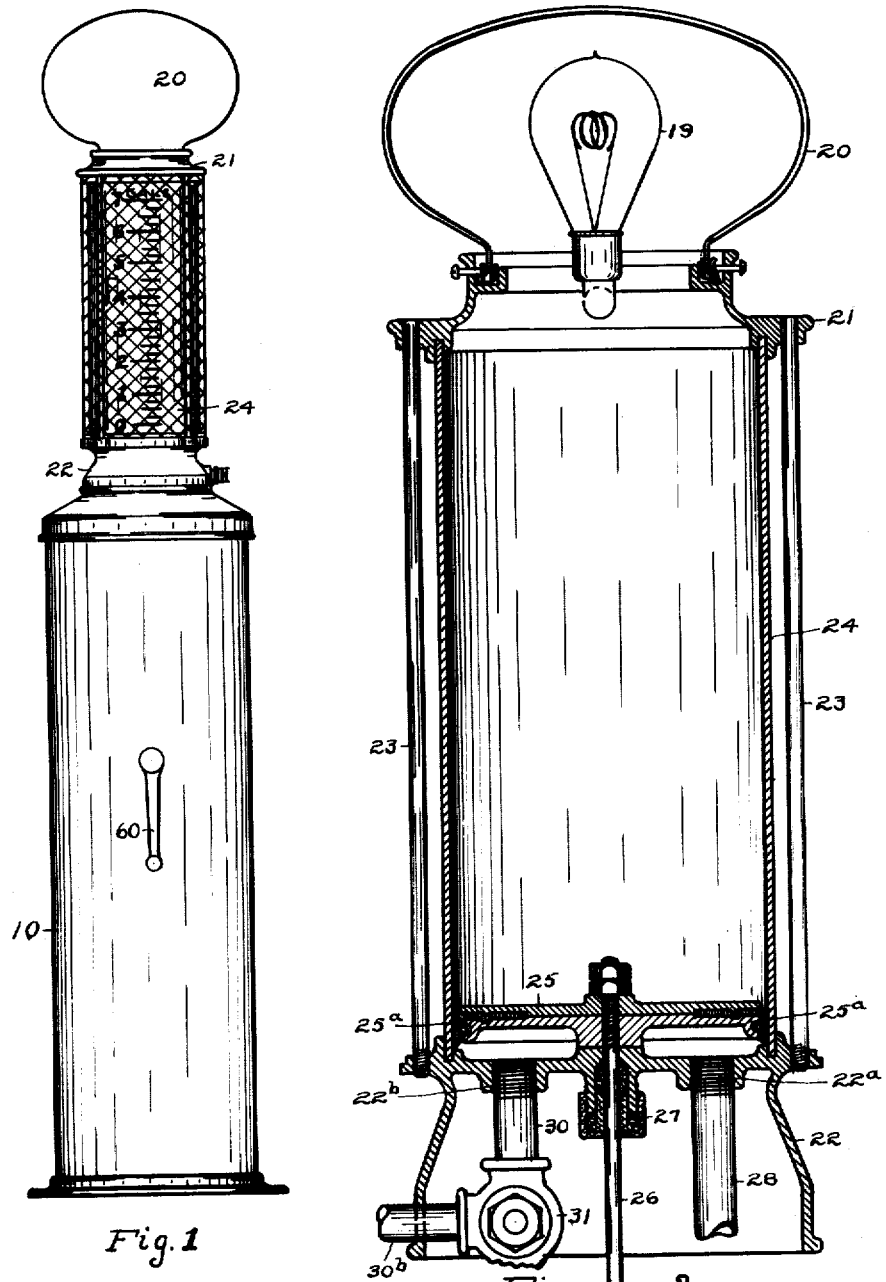

1,408,739.

Patented Mar. 7, 1922.

5 SHEETS—SHEET 4.

INVENTOR.
N. D. Hull
BY
Elwin M. Hulse
ATTORNEY.

UNITED STATES PATENT OFFICE.

NATHANIEL D. HULL, OF WICHITA, KANSAS, ASSIGNOR, BY MESNE ASSIGNMENTS, TO NATIONAL PUMP COMPANY, OF OWENSBORO, KENTUCKY, A CORPORATION.

LIQUID-MEASURING PUMP.

1,408,739.  Specification of Letters Patent.  Patented Mar. 7, 1922.

Application filed December 8, 1919, Serial No. 343,196. Renewed October 29, 1921. Serial No. 511,449.

*To all whom it may concern:*

Be it known that I, NATHANIEL D. HULL, a citizen of the United States, residing at Wichita, in the county of Sedgwick and State of Kansas, have invented new and useful Improvements in Liquid-Measuring Pumps, of which the following is a specification.

The invention relates to devices for pumping and measuring liquids and especially to such pumps adapted to measure gasoline or oil delivered thereby from storage tanks to automobiles and the like in which the liquid pumped and delivered is visible to the user or purchaser.

The object of the invention is to provide a device which shall be both vending and non-vending and by which a predetermined quantity of liquid may be drawn and accurately measured, the liquid pumped being visible, and which, when the predetermined quantity of liquid has been pumped, will automatically stop and lock, the discharge of the measured liquid being impossible until the pump has stopped operating and locked.

Another object is to provide a device with vending means by which it will be caused to deliver liquid to the value of a coin deposited therein and then automatically stop its operation and lock against further operation. Other objects will appear hereinafter.

Figure 3:
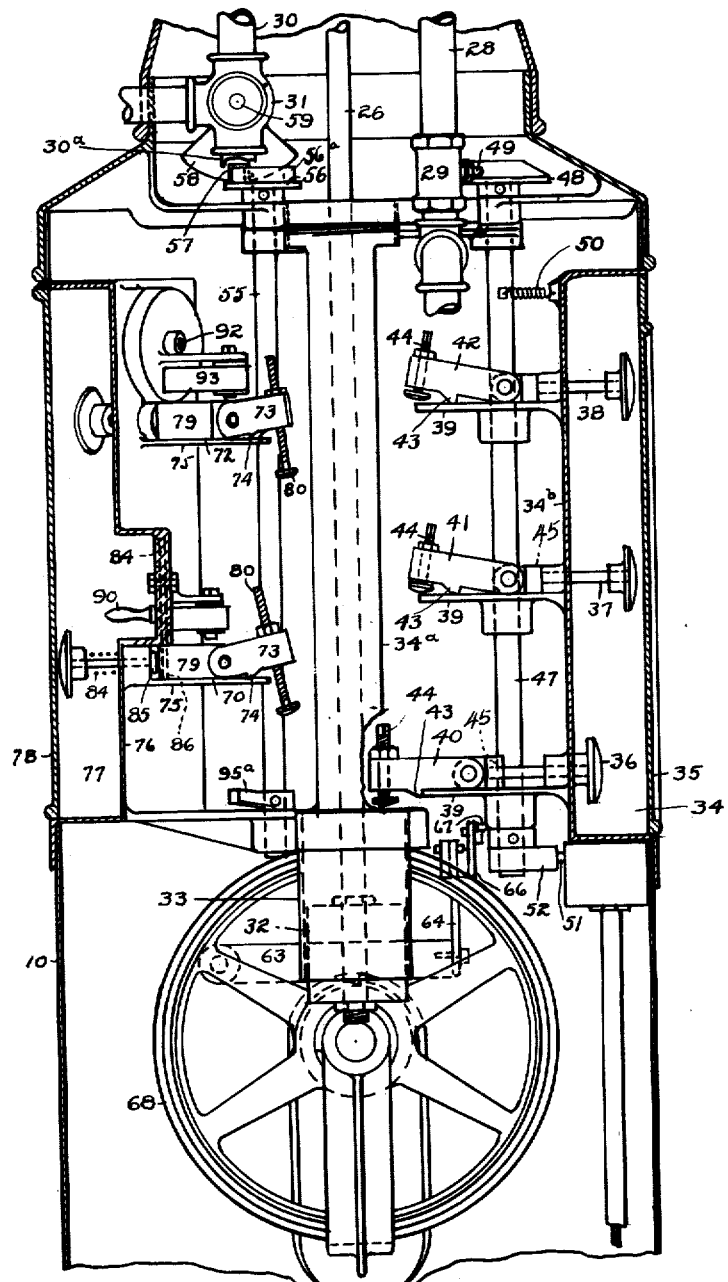
Figure 4:
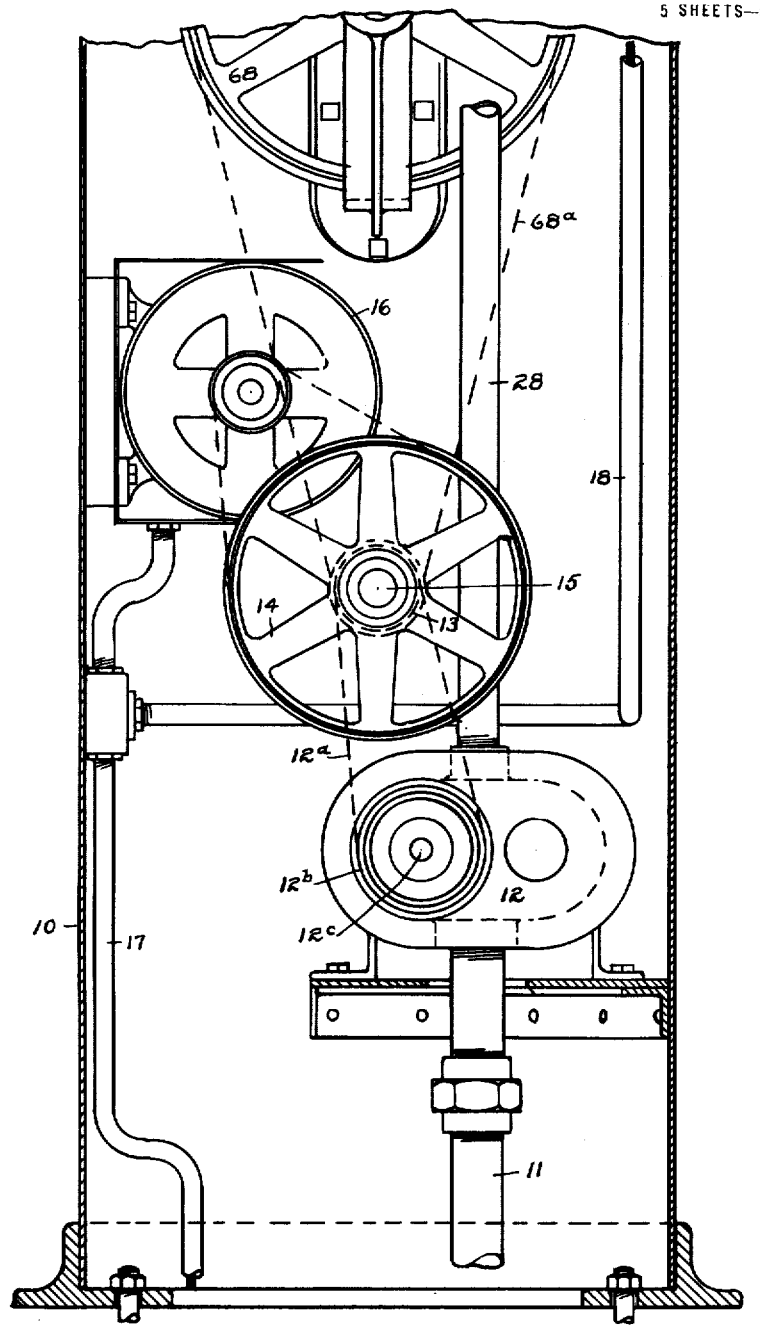
Figure 6:
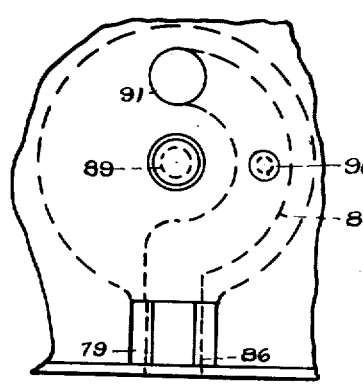
Figure 7:
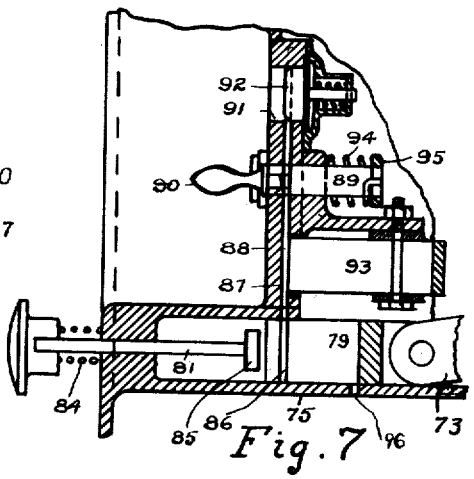
Figure 5:
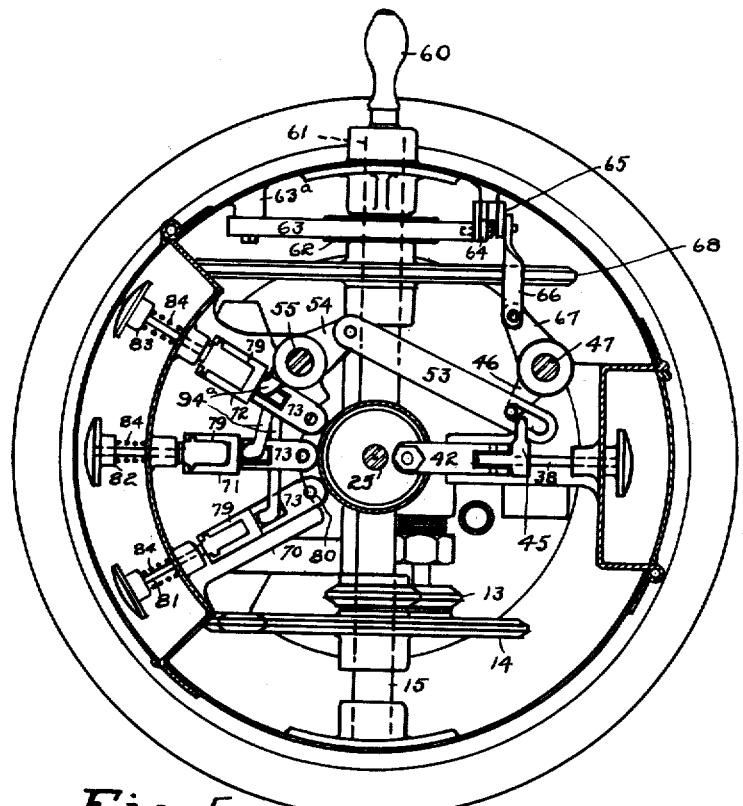
Figure 8:
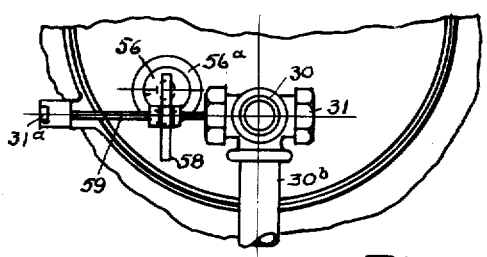
Figure 9:
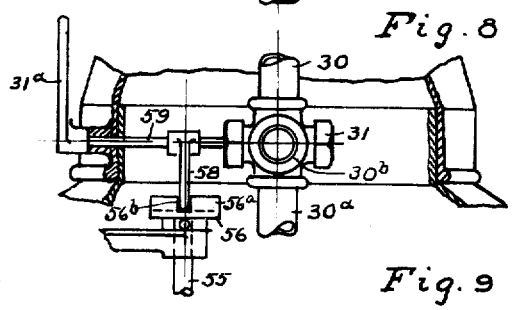
Figure 10:
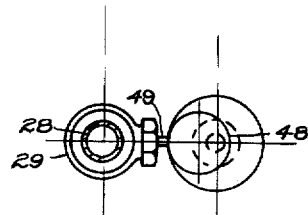
Figure 11:
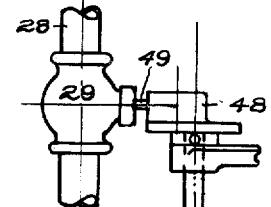
Figure 12:
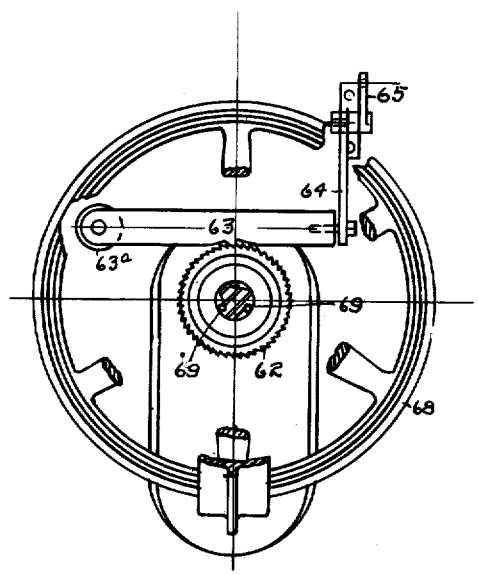
Figure 13:
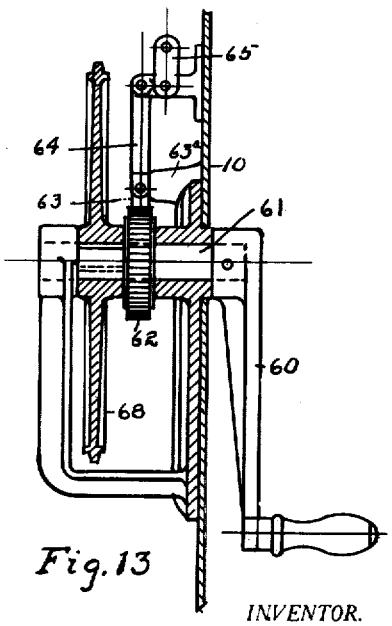

In the accompanying drawings I have illustrated one form of the invention in which Figure 1 is an elevational view of a device constructed in accordance with the invention;

Fig. 2 a vertical cross-sectional view of the measuring cylinder and plunger;

Fig. 3 a central vertical sectional view of the upper portion of the housing and mechanism therein;

Fig. 4 a central vertical sectional view of the lower portion of the housing and mechanism therein;

Fig. 5 a cross-sectional view on line 5—5 of Fig. 3;

Fig. 6 a front elevational view of the coin slot;

Fig. 7 a vertical cross-sectional view of the coin receiving device;

Fig. 8 a plan view of the discharge valve and operating means;

Fig. 9 an elevational view of the discharge valve and operating means;

Fig. 10 a plan view of the intake valve and operating means;

Fig. 11 an elevational view of the same;

Fig. 12 a rear elevational view of the hand operating device, and Fig. 13 a side elevational view of the same partly in section.

Referring to the drawings, the housing 10 rests upon the floor or sidewalk or ground, the storage tank (not shown) being installed under ground at a selected point. Suction pipe 11 leads from the storage tank, its upper end being connected to pump 12 of suitable construction, but preferably of the rotary type. The pump is suitably mounted within the housing and chain $12^a$ connects sprocket $12^b$ on shaft $12^c$ of the pump to sprocket 13 driven by wheel 14 mounted on auxiliary shaft 15, the wheel having chain or belt driven connection to electric motor 16. Conduit 17, extending up through the housing, contains the circuit wires for supplying electrical current to the motor and for supplying lighting current through wires contained in conduit 18 to electric lamp 19 enclosed by globe 20 suitably mounted at the top of the apparatus. Globe 20 is adapted to throw the light rays of the lamp outwardly and downwardly so as to illuminate the entire apparatus, and it is suitably supported by upper head 21 supported on lower head 22 by rods 23. Cylinder 24 is in fluid tight connection with head 22 and is held in said position by head 21 when rods 23 are screwed down in head 22. The cylinder, preferably formed of glass, is suitably graduated to indicate gallons and quarts or any other desired quantities, or the graduations may be provided in any other suitable manner.

Plunger 25 is reciprocably mounted within the cylinder and is rendered fluid tight by suitable leather cups $25^a$. Rod 26 is suitably secured to the plunger and extends downwardly through head 22 and stuffing box 27 into the housing. Head 22 is provided with two openings $22^a$ and $22^b$, pipe 28 having valve 29 therein being connected to the head in opening $22^a$, the lower end of the pipe being connected to the discharge side of pump 22 so that liquid drawn by the pump from the storage tank is discharged into cylinder 24 under the control of valve 29. Discharge pipe 30 having valve 31 therein is connected to head 22 in opening 22$^b$ and leads exteriorly of the housing. a hose (not shown) being connected to the outer end of the pipe for conducting the liquid from the cylinder to the receptacle which it is desired to fill.

Weight 32 is secured to the lower end of plunger rod 26 and is reciprocable in a suitable guide 33, rod 26 being also operative in pipe 34$^a$. As liquid is discharged into the cylinder by the pump the plunger with its weight 32 rises with the liquid, and the upper edge or other selected part of the plunger cooperates with the scale to indicate the quantity of liquid delivered to the cylinder. As the level of the liquid falls upon its discharge from the cylinder the plunger and weight descend to normal position.

A compartment 34 (Fig. 3) is formed in the upper part of the housing having a door 35 to afford access to the compartment. Plungers 36, 37 and 38 are longitudinally slidable in the rear wall 34$^b$ of the compartment, knobs being provided at their outer or forward ends for convenience of operation. The rear or inner ends of the plungers slide on guides 39 projecting inwardly from wall 34$^b$ and said ends are pivotally connected respectively to stop bars 40, 41 and 42. Each stop bar has a depending latch or lug 43 adapted to engage the inner end of guide 39 when the plunger has been pushed inwardly, and each stop bar has an adjusting screw 44 at its inner end, and also a laterally projecting lug 45 (Fig. 5) which normally abuts a lever 46 secured to vertical shaft 47 revolubly mounted within the housing and having a cam 48 secured at its upper end adapted to reciprocate spring opposed stem 49 connected to valve 29 for operating the valve. Spring 50 is suitably connected to shaft 47 to oppose the revolution of the shaft from left to right (Figure 5). When a stop bar is pushed inwardly until lug or latch 43 engages the inner end of guide 39, lug 45, through lever 46 causes shaft 47 to rotate clockwise to rotate cam 48 and permit valve 29 to open, the engagement of the stop bar and the guide serving to retain the shaft in its rotated position and to permit the valve to remain open.

The stop bars are disposed at the proper heights with respect to weight 32 to cause the pump to deliver to the measuring cylinder the desired quantity of liquid. As illustrated, stop bar 40 is for one gallon, stop bar 41 for three gallons and stop bar 42 for five gallons. When a stop bar is pushed inwardly and locked by latch 43 the adjusting screw 44 is moved into the path of the ascending weight 32. The weight in its ascent abuts the adjusting screw and elevates the stop bar sufficiently to release latch 43, whereupon spring 50 rotates shaft 47 contraclockwise to restore the stop bar and plunger to normal position and to cause cam 48 to close valve 29, thereby cutting off further delivery of liquid to the measuring cylinder, the quantity which has been delivered to the cylinder being that measured by the travel of the weight from its lowermost position to the stop bar.

An electric switch 51 adjacent shaft 47 and adapted to be opened and closed by arm 52 on the shaft, controls the power circuit to the electric motor, the switch being closed when a plunger is pushed inwardly and opened when spring 50 reverses the rotation of shaft 47.

A link 53 is pivotally connected at one end to lever 46 and at its opposite end to lever 54 secured to vertical shaft 55, by which levers and link, shaft 55 is caused to rotate upon each rotation of shaft 47. Lock disk 56 is secured to the upper end of shaft 55 and a rim 56$^a$ projects upwardly from the periphery of the disk and radial slot 56$^b$ is formed in the rim. (Fig. 9.) Plate 58 secured to stem 59 of valve 31 is adapted to be moved through slot 56$^b$ when stem 59 is rotated by handle 31$^a$. A notch 57 is formed in the edge of plate 58 through which the rim on disk 56 is adapted to pass when the notch registers with the rim. Normally handle 31$^a$ is in the position shown in Fig. 9 and plate 58 is free to move through slot 56$^b$ and notch 57 is in register with rim 56$^b$. When shaft 55 is rotated as above described the disk is also rotated to carry its rim into notch 57 thereby preventing all movement of plate 58 and locking the valve in closed position so that while the pump is in operation no liquid may be discharged from cylinder 24. If the discharge valve is in open position plate 58 will necessarily be in slot 56$^b$ of disk 56 in which position of the disk and shaft 55 rotation of the same is impossible by an attempt to rotate shaft 47 by pushing in a stop bar 40, 41 or 42. The reverse movement of shaft 55 caused by the reverse movement of shaft 47 under the influence of spring 50 when the previously operated stop bar has been released by weight 32, rotates the disk 56 until its slot 56$^b$ registers with plate 58, whereupon the valve may be opened to discharge the liquid in the cylinder.

Lever 31$^a$ (Fig. 9) is turned rearwardly to open valve 31 to permit the liquid to flow by gravity from cylinder 24 through discharge pipe 30 into the receptacle to be filled. When the cylinder has been emptied lever 31$^a$ is turned to the vertical position to close the valve. In the event liquid remains in the cylinder, as when the requirements of the customer do not empty the cylinder, lever 31$^a$ is turned forwardly to rotate the valve to connect the cylinder to drain pipe 30ᵃ which leads back to the storage tank and when the cylinder has been drained the lever is restored to vertical position to close the valve. The pump may be operated a second time only after the discharge valve has been closed. Hence it is impossible to operate the pump with the discharge valve open either to discharge the liquid to the customer's receptacle or to drain the liquid back to the reservoir or storage tank. Accordingly neither the customer nor the owner or dealer may be cheated by the operation of the device.

In order that the apparatus may be operated in case of failure of electrical current to operate the motor, I provide a hand operated means for driving the pump consisting of a crank 60 secured to the outer projecting end of shaft 61 (Fig. 13). Ratchet wheel 62 is secured to shaft 61 within housing 10 and is normally engaged by ratchet lever 63 suitably pivoted at one end to lug 63ᵃ projecting from the housing. The opposite end of the ratchet lever is pivotally connected to the lower end of link 64 pivoted at its upper end to lever 65. Link 66 is pivotally connected to lever 65 and to lever 67 secured to the lower end of shaft 47 (Figs. 3 and 5). When shaft 47 is rotated by pushing in one of the plungers 36, 37 or 38, lever 67, through link 66, rocks lever 65 which, through link 64, elevates ratchet lever 63 from ratchet wheel 62 thereby releasing shaft 61 so that it may be rotated by crank 60. Normally the engagement of ratchet lever 63 and wheel 62 locks shaft 61 against operation. Gear 68 loosely mounted on shaft 61 is adapted to be connected thereto by roller pawls 69 (Fig. 12) when the shaft is rotated in proper direction, the gear being idle if the shaft is rotated in the opposite direction to prevent operating the pump to withdraw liquid from the cylinder. The gear runs idly when the electric motor is driving the pump, and chain 68ᵃ connects the gear to a suitable gear or sprocket secured to intermediate shaft 15 (Fig. 4).

It will be advantageous that the apparatus shall also be capable of operation as a vending mechanism and deliver liquid to the value of a coin or check deposited by the customer or user, so that the customer or user may secure liquid in the absence of the owner. For this purpose I provide a series of coin stop-bars designed to be operated upon the deposit therein of the proper coin or check. In the drawings I show three such coin stop-bars indicated generally by numerals 70, 71 and 72, (Fig. 5), bar 70 being say, the twenty-five cent quantity, bar 71, the fifty-cent quantity and bar 72 the one dollar quantity. Each coin stop bar consists of a member 73 having a depending lug or latch 74 adapted to engage the end of guide 75 projecting rearwardly from wall 76 of compartment 77 formed in the housing 10 and closed by door 78, the member being pivoted to a hollow member 79 slidable longitudinally on the support. Adjusting screw 80 is mounted in the rear end of member 73 and is moved into the path of ascending weight 32 when the stop bar is operated. The screw has a relatively wide range of adjustment in order that as the price of the liquid to be vended varies from time to time the screw may be adjusted in accordance with the price and cause the pump to deliver to the cylinder 24 the exact amount of liquid which the coin deposited will purchase. Plungers 81, 82 and 83, one for each stop bar, are reciprocably mounted in wall 76, each having a spring 84 about the same to oppose the inward movement thereof and adapted to restore the plunger and stop bar to normal position when released by weight 32. The inner end of each plunger is within the forward end of the corresponding member 79, a collar 85 thereon preventing the separation of the same and also serving to move the stop bar when the proper coin or check is deposited in member 79. A coin slot 86 (Fig. 5) is formed in each member 79 at a suitable point and it and member 79 are of the proper size to receive the coin for which they are intended. In the normal position of the coin stop-bar its slot 86 registers with the lower end of slot 87 formed in a disk 88 (Figs. 6 and 7) revolubly mounted on shaft 89 suitably carried by wall 76, handle 90 being secured to the disk by which the disk may be rotated. The upper end of slot 87 communicates with opening 91 in the disk, a spring opposed plunger 92 being reciprocably mounted in the opening and adapted to be moved rearwardly by pressing a coin or check of the required denomination against it, the movement continuing until the coin registers with slot 87. When the coin registers with slot 87 the disk is rotated to the right (Fig. 6) to cause the coin to travel in the slot to its lowest point, at which point the coin is directly in front of a suitable magnet 93. If the article deposited is an iron slug or washer or the like intended to cheat the apparatus the magnet will attract the same and hold it until the handle 90 is released whereupon spring 94 engaged at one end to shaft 89 and at its other end to frame 95, will cause the disk to rotate in the opposite direction and carry the article back to opening 91 from which it will be ejected by plunger 92, the plunger having been held in retracted position by the disk. If the article inserted in opening 91 is the proper coin or check it will not be affected by the magnet but will drop out of slot 87 into slot 86 of the coin stop bar. The plunger corresponding to the slot into which the coin has been deposited is then pushed inwardly, the inner end of the same abuts the coin in slot 86 and continued movement of the plunger moves the stop bar longitudinally on guide 75 and member 73, when latch 74 passes beyond the end of the guide, drops down on the guide and the latch engages the end of the guide to lock the stop bar in its moved position with adjusting screw 80 in the path of the ascending weight 32. Unless a coin is in slot 86 the movement of the plunger has no effect on the stop bar. At the time latch 74 engages the end of guide 75 the coin has been brought in register with slot 96 in guide 75 through which the coin drops into a suitable receptacle.

An arm 94ª (Fig. 5) projects laterally from each coin stop bar and is adapted to engage lever 95ª secured to shaft 55 by which arm and lever the shaft is turned as the stop bar is moved inwardly, the rotation of the shaft causing disk 56 to lock the discharge valve 31 in closed position and through levers 46 and 54 and link 53 to cause shaft 47 to turn to open valve 29 and close switch 51 in the electric motor circuit. The pump delivers liquid into cylinder 24, weight 32 rising as before described and abutting the operated coin stop-bar and elevating the same to release latch 74, whereupon spring 50 restores the several parts to normal position, the inlet valve 29 is closed and discharge valve 31 is unlocked so that it may be opened to discharge the liquid from the cylinder or drain the contents thereof back to the storage tank. The position of the coin stop-bar and the adjustment of its adjusting screw are such that when the weight 32 has released the bar the quantity of liquid delivered by the pump into the cylinder will be exactly that which the value of the coin deposited in the bar would purchase. If desirable the adjusting screws 80 may be graduated to facilitate their adjustment according to the retail price of the liquid to be vended.

It will be noted that each of the several stop bars on both the vending and non-vending sides of the apparatus is so positioned that the quantity of liquid delivered by the pump into the cylinder 24 is measured by the travel of the weight from its normal position to the point where it releases the stop bar which has been operated, and the fact that the liquid delivered to the cylinder is visible and the quantity may be readily determined on the graduated scale on the cylinder there is no opportunity of defrauding the customer nor opportunity for the customer to defraud the owner. The doors to the plunger compartments will, of course, be provided with locks, especially the door to the non-vending plunger compartment to secure the same against unauthorized operation of the mechanism.

The device may be constructed with either the vending or non-vending stop bars or with the combination of both as illustrated in the drawings.

What I claim is:

1. In a liquid dispensing mechanism the combination of a pump, a receptacle having communication with the pump and adapted to accumulate liquid delivered by the pump, an intake valve to control the communication, means to discharge the liquid from the receptacle, a valve to control said means, a cam shaft to operate the intake valve, means operatively connected to the cam shaft for locking the discharge valve in closed position when the intake valve is open, and to prevent the operation of the pump when the discharge valve is open, selective means operative by means responsive to the quantity of liquid delivered to the receptacle to cause the cam shaft to close the intake valve upon the delivery of a predetermined quantity of liquid into the receptacle.

2. In a liquid dispensing mechanism, the combination of a pump, a receptacle to accumulate liquid delivered by the pump, a valve to control the delivery of liquid to the receptacle, a valve to control the discharge of liquid from the receptacle, a revoluble cam-carrying shaft normally closing the delivery valve, a second shaft operatively connected to the cam-carrying shaft and having means to lock the discharge valve in closed position and adapted to cooperate with the discharge valve when open to prevent the opening of the delivery valve and the operation of the pump, a series of selective reciprocable stop bars having connection with one of the shafts and adapted, when reciprocated in one direction, to cause the shafts to rotate to open the delivery valve and to lock the discharge valve, and movable means responsive to the quantity of liquid in the receptacle adapted to abut the selected stop-bar and permit the shafts to rotate in the opposite direction to close the delivery valve and to unlock the discharge valve.

3. In a liquid dispensing mechanism, the combination of a pump, a receptacle to accumulate liquid delivered by the pump, a valve to control the discharge of liquid to the receptacle, a valve to control the discharge of liquid from the receptacle, a revoluble cam-carrying shaft normally closing the delivery valve, a second shaft operatively connected to the cam-carrying shaft and having means to lock the discharge valve in closed position and adapted to cooperate with the discharge valve when open to prevent the opening of the delivery valve and the operation of the pump, a series of selective reciprocable top bars having connection with one of the shafts and adapted, when reciprocated in one direction, to cause the shafts to rotate to open the delivery valve and to lock the discharge valve, and movable means responsive to the quantity of liquid in the receptacle adapted to abut the selected stop-bar and permit the shafts to rotate in the opposite direction to close the delivery valve and to unlock the discharge valve, an electric motor to drive the pump and a switch operated by the cam shaft to control the operation of the electric motor.

4. In a liquid dispensing mechanism the combination of a pump, a receptacle to accumulate liquid delivered by the pump, a valve to control said delivery of liquid, a discharge means connected to the receptacle, a valve to control said means, means to simultaneously open the delivery valve and lock the discharge valve in closed position and adapted to cooperate with the discharge valve when open to lock the delivery valve in closed position, a plurality of selective stop bars each adapted to lock the delivery valve in open position, means responsive to the level of the liquid in the receptacle to release the stop bars upon the delivery by the pump of a predetermined quantity of liquid and cause the valve operating means to close the delivery valve and release the discharge valve, the valve operating means having means operative thereby for preventing the operation of the pump.

5. In a liquid dispensing mechanism the combination of a pump, a receptacle to accumulate liquid delivered by the pump, a valve to control said delivery of liquid, a discharge means connected to the receptacle, a valve to control said means, means to simultaneously open the delivery valve and lock the discharge valve in closed position and adapted to cooperate with the discharge valve when open to lock the delivery valve in closed position, a plurality of selective stop bars each adapted to lock the delivery valve in open position, means responsive to the level of the liquid in the receptacle to release the stop bars upon the delivery by the pump of a predetermined quantity of liquid and cause the valve operating means to close the delivery valve and release the discharge valve, the valve operating means having means operative thereby for preventing the operation of the pump and a portion of the selective stop bars being coin controlled.

In witness whereof I have hereunto subscribed my name this 29th day of November, 1919.

NATHANIEL D. HULL.